(12) United States Patent
Yang et al.

(10) Patent No.: US 9,317,939 B2
(45) Date of Patent: Apr. 19, 2016

(54) METHOD AND DEVICE FOR IMAGE CONVERSION FROM RGB SIGNALS TO RGBW SIGNALS

(71) Applicant: BOE TECHNOLOGY GROUP CO., LTD., Beijing (CN)

(72) Inventors: Fei Yang, Beijing (CN); Zhongyuan Wu, Beijing (CN); Danna Song, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 60 days.

(21) Appl. No.: 14/355,077

(22) PCT Filed: May 30, 2013

(86) PCT No.: PCT/CN2013/076504
§ 371 (c)(1),
(2) Date: Apr. 29, 2014

(87) PCT Pub. No.: WO2014/153833
PCT Pub. Date: Oct. 2, 2014

(65) Prior Publication Data
US 2015/0154762 A1  Jun. 4, 2015

(30) Foreign Application Priority Data
Mar. 25, 2013 (CN) .......................... 2013 1 0097709

(51) Int. Cl.
| G09G 5/02 | (2006.01) |
| G06T 11/00 | (2006.01) |
| H04N 9/67 | (2006.01) |
| G06T 3/20 | (2006.01) |
| G06T 7/40 | (2006.01) |
| H04N 5/14 | (2006.01) |

(52) U.S. Cl.
CPC ................. *G06T 11/001* (2013.01); *G06T 3/20* (2013.01); *G06T 7/408* (2013.01); *G09G 5/02* (2013.01); *H04N 9/67* (2013.01); *H04N 5/14* (2013.01)

(58) Field of Classification Search
None
See application file for complete search history.

(56) References Cited

U.S. PATENT DOCUMENTS 5,384,519 A * 1/1995 Gotoh ........................... 315/324
2005/0083341 A1* 4/2005 Higgins et al. ................ 345/590

(Continued)

FOREIGN PATENT DOCUMENTS

| CN | 101076848 A | 11/2007 |
| CN | 101419771 A | 4/2009 |

OTHER PUBLICATIONS

International Search Report mailed Jan. 2, 2014; PCT/CN2013/076504.
First Chinese Office Action Appln. No. 201310097709,3; Dated Sep. 1, 2014.
Written Opinion of the International Searching Authority dated Dec. 25, 2013; PCT/CN2013/076504.

*Primary Examiner* — Yingchun He
(74) *Attorney, Agent, or Firm* — Ladas & Parry LLP

(57) ABSTRACT

Provided are a method and device for image conversion from RGB signals to RGBW signals. The method includes the steps of converting RGB input signals as received into corresponding RGB luminance input values respectively; determining RGBW luminance output values respectively according to a position relationship between a corresponding point of the RGB luminance input values and regions divided by RGBW in a chromaticity diagram; and converting the determined RGBW luminance output values into corresponding RGBW output signals respectively and outputting the RGBW output signals.

16 Claims, 4 Drawing Sheets

(56) References Cited

U.S. PATENT DOCUMENTS

| | | |
|---|---|---|
| 2005/0083352 A1 | 4/2005 | Higgins |
| 2006/0268003 A1* | 11/2006 | Tanase et al. ................. 345/603 |
| 2009/0102769 A1 | 4/2009 | Kouno et al. |

* cited by examiner

METHOD AND DEVICE FOR IMAGE CONVERSION FROM RGB SIGNALS TO RGBW SIGNALS

TECHNICAL FIELD

The present disclosure relates to a field of display technology, particularly to a method and device for image conversion from RGB signals into RGBW signals.

BACKGROUND

At present, in an image display device such as a Liquid Crystal Display panel and an Organic electroluminescence Light-Emitting Diode display panel, a pixel unit comprises a Red(R) sub-pixel unit, a Green(G) sub-pixel unit and a Blue (B) sub-pixel unit, and a color image is displayed by controlling the grayscale values of respective sub-pixel units to be blended together to obtain a color as needed to be displayed. Since luminous efficiency of RGB primary colors is relatively low, optimization of the display device being constructed by the RGB primary colors is constrained. In view of the above, a pixel unit comprising a Red(R) sub-pixel unit, a Green(G) sub-pixel unit, a Blue(B) sub-pixel unit and a White(W) sub-pixel unit is developed to improve the luminous efficiency of a RGB display.

Currently, conventional signal transmission interfaces, such as a VGA interface, a DVI interface and the like, transmit RGB signals; while if the RGB signals are directly applied to a RGBW display, the displayed image will be distorted; thus, it is necessary to make a conversion on the RGB signals which are input to the RGBW display.

Therefore, it is a technical problem to be solved urgently by those skilled in the art that how to convert the RGB signals into the RGBW signals without distortion.

SUMMARY

In embodiments of the present disclosure, there are provided a method and device for image conversion from RGB signals into RGBW signals, which can convert the RGB signals into the RGBW signals without distortion.

The method for image conversion from RGB signals into RGBW signals provided in the embodiment of the present disclosure, wherein the method comprises:

converting RGB input signals as received into corresponding RGB luminance input values respectively;

determining RGBW luminance output values respectively according to a position relationship between a corresponding point of the RGB luminance input values and regions divided by RGBW in a chromaticity diagram; and converting the determined RGBW luminance output values into corresponding RGBW output signals respectively and outputting the same.

The device for image conversion from RGB signals into RGBW signals provided in the embodiment of the present disclosure, wherein the device comprises:

a signal receiving unit for receiving RGB input signals;

a conversion unit for converting the received RGB input signals into corresponding RGB luminance input values respectively;

a calculation unit for determining RGBW luminance output values respectively according to a position relationship between a corresponding point of the RGB luminance input values and regions divided by RGBW in a chromaticity diagram;

an inverse conversion unit for converting the determined RGBW luminance output values into corresponding RGBW output signals respectively; and a signal output unit for outputting the RGBW output signals.

The embodiments of the present disclosure can achieve the following beneficial effects:

In the method and device for image conversion from RGB signals to RGBW signals provided in the embodiments of the present disclosure, RGB input signals as received are converted into the corresponding RGB luminance input values respectively; the RGBW luminance output values are determined respectively according to the position relationship between the corresponding point of the RGB luminance input values and the regions divided by RGBW in a chromaticity diagram; and the determined RGBW luminance output values are converted into the corresponding RGBW output signals respectively and the RGBW output signals are output. Since the RGB luminance input values are converted into the RGBW luminance output values by determining the corresponding point of the RGB luminance input values in the chromaticity diagram, it can be ensured that color distortion does not occur in the conversion procedure from RGB signals to RGBW signals. Further, when the RGBW luminance output values are determined according to the corresponding point of the RGB luminance input values in the chromaticity diagram, the digital values of the RGBW luminance output values are adjustable as desired, thus improving the luminance of the display device as a whole, and enhancing the image contrast.

DETAILED DESCRIPTION OF THE PREFERRED EMBODIMENTS

Hereinafter, detailed descriptions will be given to implementations of the method and device for image conversion from RGB signals into RGBW signals provided in the embodiments of the present disclosure.

Figure 1:
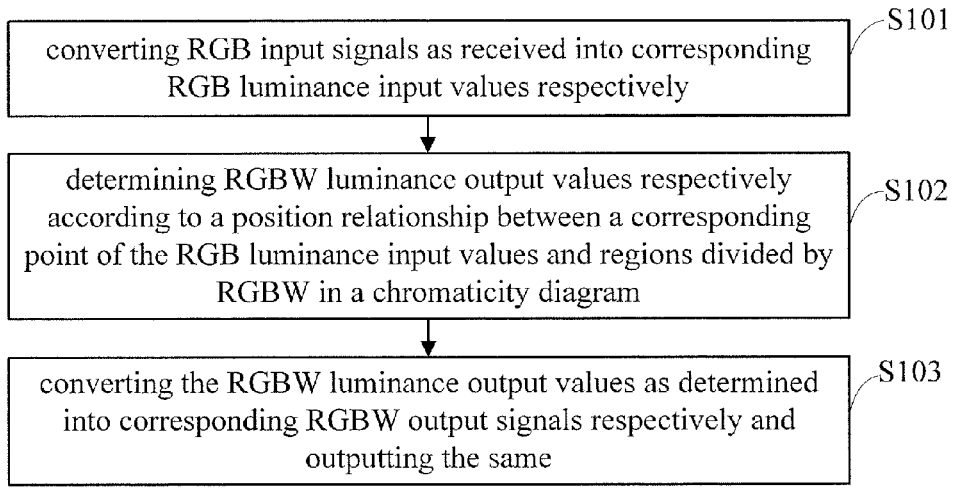
FIG. 1 is a first flowchart illustrating a method for image conversion from RGB signals into RGBW signals provided in an embodiment of the present disclosure.

As shown in FIG. 1, the method for image conversion from RGB signals into RGBW signals provided in the embodiment of the present disclosure comprises the following steps:

S101, converting RGB input signals as received into corresponding RGB luminance input values respectively;

S102, determining RGBW luminance output values respectively according to a position relationship between a corresponding point of the RGB luminance input values and regions divided by RGBW in a chromaticity diagram;

S103, converting the RGBW luminance output values as determined into corresponding RGBW output signals respectively and outputting the same.

Next, detailed descriptions will be given to the implementation of the respective steps in the method for image conversion provided in the embodiment of the present disclosure.

Figure 2:
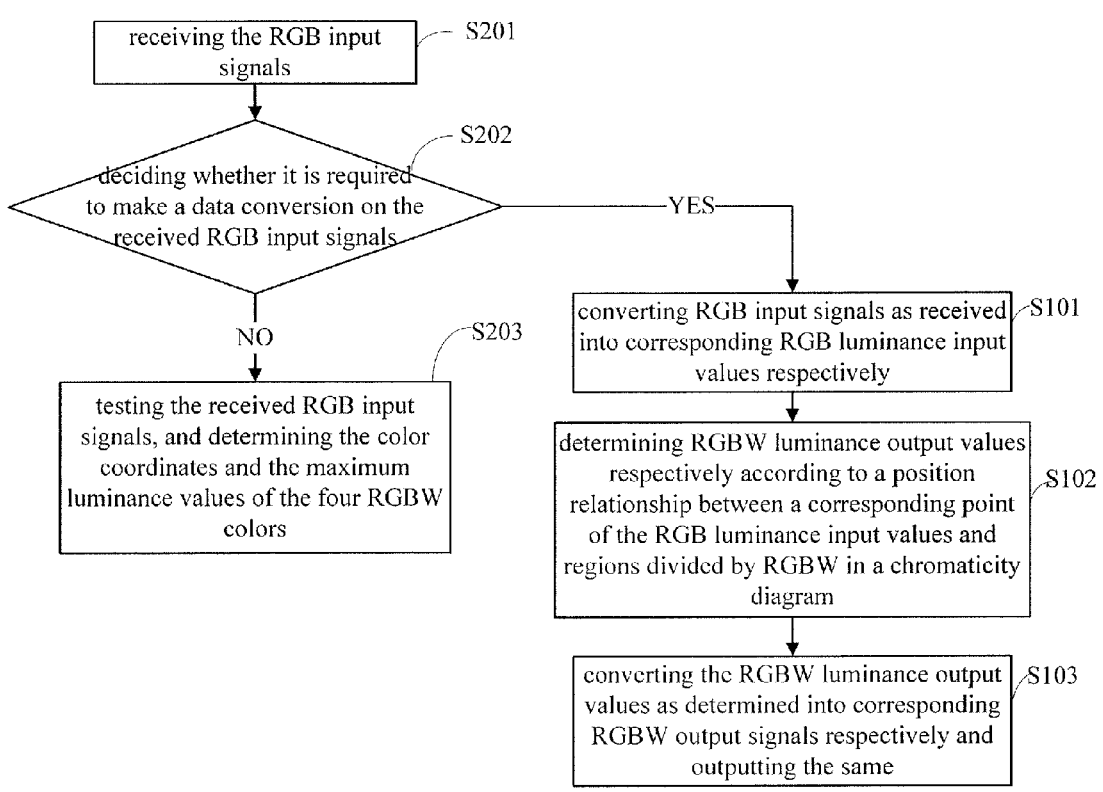
FIG. 2 is a second flowchart illustrating a method for image conversion from RGB signals into RGBW signals provided in an embodiment of the present disclosure.

In particular, in the method for image conversion provided in the embodiment of the present disclosure, before the step 101 is carried out, as shown in FIG. 2, when the RGB input signals are received, the steps as follows can be performed.

In S201, RGB input signals are received.

In the present embodiment, an 8-bit input signal is taken as an example for an input signal for each color in the RGB input signals, that is, the data signals corresponding to the three RGB colors can be represented by grayscale values within a range of 0-255 respectively.

In S202, it is decided whether it is required to make a data conversion on the received RGB input signals according to an enable signal En input from the external as received, that is, whether to perform the steps S101~S103, For example, if the enable signal input from the external En=1, a data conversion is made on the received RGB input signals, that is, the steps S101~S103 are required to be performed; if the enable signal input from the external En=0, the step S203 is performed.

In S203, the received RGB input signals are tested, and color coordinates and maximum luminance values of the four RGBW colors are determined.

In particular, the RGB input signals can be tested according to a testing control signal Test; for example, when Test=1, the signal output values $R_0$, $B_0$ and $G_0$ correspond to the signal input values $R_i$, $B_i$ and $G_i$ respectively, and the signal output value $W_0$=0; the color coordinates ($R(x_R,y_R), G(x_G,y_G), B(x_B, y_B)$) and the corresponding maximum luminance values ($L_{Rmax}, L_{Gmax}, L_{Bmax}$) of the Red(R), Green(G) and Blue(B) can be measured by means of the signal output values; when Test=0, the signal output values $R_0$=0, $B_0$=0, $G_0$=0 and $W_0$=1; the color coordinate ($W(x_w,y_w)$) and the corresponding maximum luminance value ($L_{Wmax}$) of the White(W) can be measured by means of the signal output values. Optionally, in the step S101 in the method for image conversion provided in the embodiment of the present disclosure, the received RGB input signals are converted into the corresponding RGB luminance input values respectively. In an implementation, it can be realized by a gamma conversion, that is, the RGB input signals are converted into the corresponding RGB luminance input values respectively by the following equations:

$$L_R = L_{Rmax} \times \left(\frac{Ri}{255}\right)^\gamma; L_G = L_{Gmax} \times \left(\frac{Gi}{255}\right)^\gamma; L_B = L_{Bmax} \times *\left(\frac{Bi}{255}\right)^\gamma;$$

wherein, $L_R$ represents the luminance input value of the red in the RGB luminance input values, $L_G$ represents the luminance input value of the green in the RGB luminance input values, and $L_B$ represents the luminance input value of the blue in the RGB luminance input values; Ri represents the input signal value of the red in the RGB input signals, Gi represents the input signal value of the green in the RGB input signals, and Bi represents the input signal value of the blue in the RGB input signals; $L_{Rmax}$ represents the maximum luminance value of the red, $L_{Gmax}$ represents the maximum luminance value of the green, and $L_{Bmax}$ represents the maximum luminance value of the blue; γ represents a gamma conversion factor.

Generally, in a specific computation, the gamma conversion factor γ is normally set as 2.2.

Figure 3:
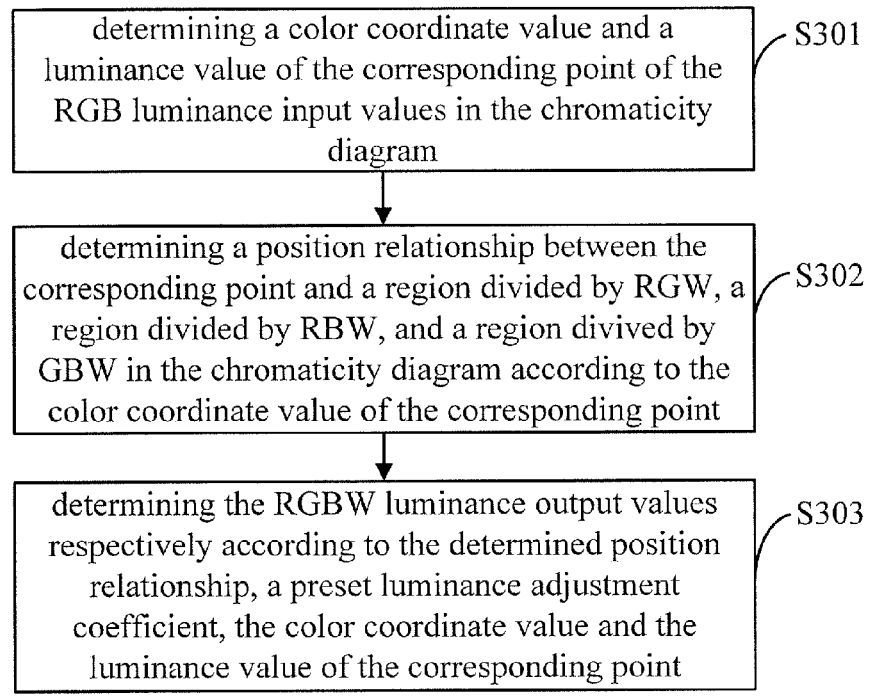
FIG. 3 is a third flowchart illustrating a method for image conversion from RGB signals into RGBW signals provided in an embodiment of the present disclosure.

In particular, in the step S102 in the method for image conversion provided in the embodiment of the present disclosure, the RGBW luminance output values are determined according to the position relationship between the corresponding point of the RGB luminance input values and the regions divided by RGBW in the chromaticity diagram, as shown in FIG. 3, the step S102 can be realized by the follows.

In S301, the color coordinate value and the luminance value of the corresponding point of the RGB luminance input values in the chromaticity diagram are determined.

Specifically, the color coordinate value and the luminance value of the corresponding point of the RGB luminance input values can be calculated as follows:

$$L_A = L_R + L_G + L_B$$

$$x = \frac{x_R \times \frac{L_R}{y_r} + x_g \times \frac{L_G}{y_g} + x_b \times \frac{L_B}{y_b}}{\frac{L_R}{y_r} + \frac{L_G}{y_g} + \frac{L_B}{y_b}}$$

$$y = \frac{L_R + L_G + L_B}{\frac{L_R}{y_r} + \frac{L_G}{y_g} + \frac{L_B}{y_b}}$$

wherein, $L_A$ represents the luminance value of the corresponding point; $L_G$ represents the luminance input value of the green in the RGB luminance input values, $L_B$ represents the luminance input value of the blue in the RGB luminance input values, and $L_R$ represents the luminance input value of the red in the RGB luminance input values; (x, y) represents the color coordinate value of the corresponding point in the chromaticity diagram; ($x_r, y_r$) represents the color coordinate value of the red in the chromaticity diagram, ($x_g, y_g$) represents the color coordinate value of the green in the chromaticity diagram, and ($x_b, y_b$) represents the color coordinate value of the blue in the chromaticity diagram.

S302, the position relationship between the corresponding point and the region divided by ROW, the region divided by RBW, and the region divided by GBW in the chromaticity diagram is determined according to the color coordinate value of the corresponding point.

In S303, the RGBW luminance output values are determined respectively according to the determined position relationship, a preset luminance adjustment coefficient, the color coordinate value and the luminance value of the corresponding point; wherein the luminance adjustment coefficient is predetermined according to actual requirements; in an implementation, the RGBW luminance output values are improved by varying the luminance adjustment coefficient. In practice, the digital range of the luminance adjustment coefficient is generally set as 0.5-2.

Figure 4:
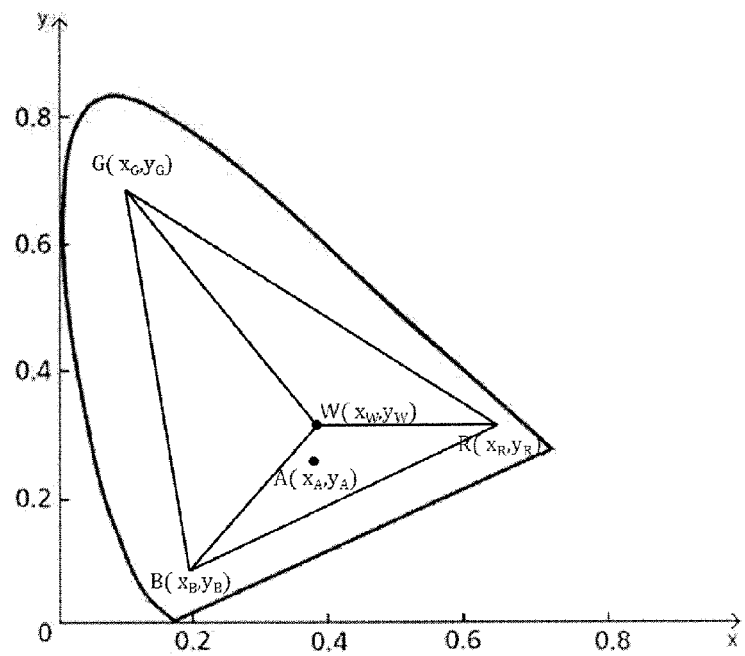
FIG. 4 is a schematic diagram for illustrating a construction of a corresponding point A in a chromaticity diagram provided in an embodiment of the present disclosure.
Figure 5:
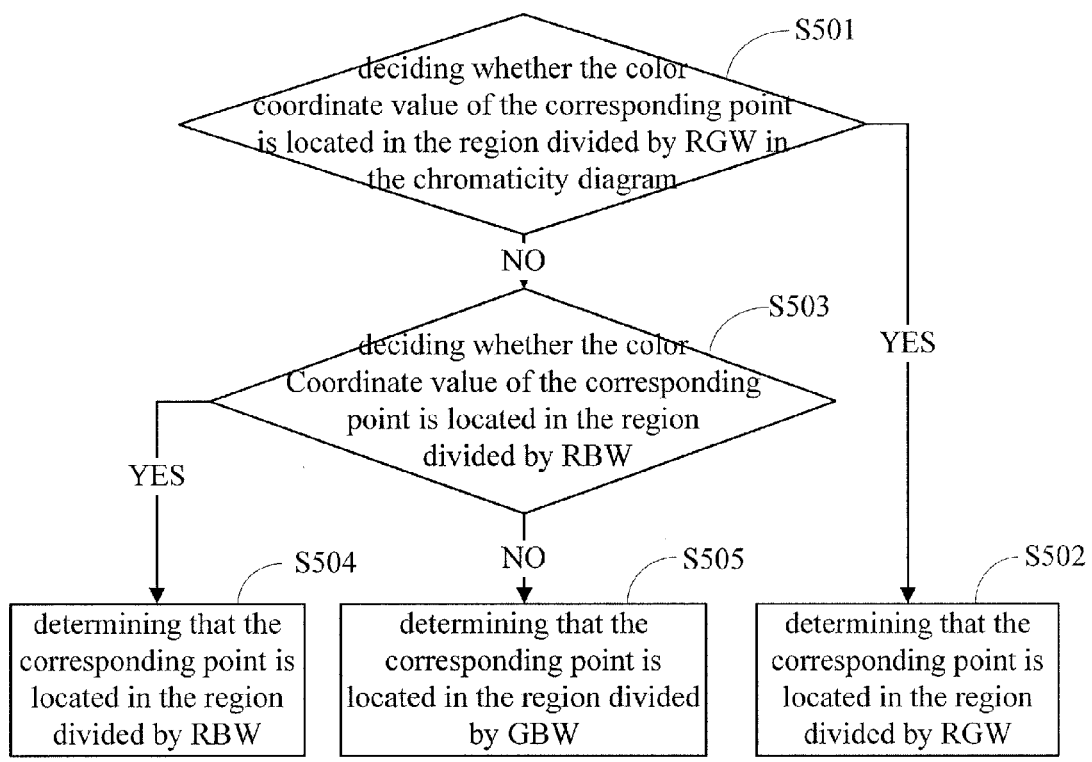
FIG. 5 is a fourth flowchart illustrating a method for image conversion from RGB signals into RGBW signals provided in an embodiment of the present disclosure.

In the step S302, the position relationship between the corresponding point A and the region divided by RGW, the region divided by RBW, and the region divided by GBW in the chromaticity diagram shown in FIG. 4 is determined, that is, it is determined which of the region divided by RGW, the region divided by RBW, and the region divided by GBW is the region where the color coordinate value of the corresponding point is located; in practice, as shown in FIG. 5, it can be realized as follows:

S501, deciding whether the color coordinate value of the corresponding point is located in the region divided by RGW in the chromaticity diagram; performing step S502 when it is determined that the color coordinate value of the corresponding point is located within the region divided by RGW; performing step S503 when it is determined that the color coordinate value of the corresponding point is located outside the region divided by RGW;

S502, determining that the corresponding point is located in the region divided by RGW;

S503, deciding whether the color coordinate value of the corresponding point is located in the region divided by RBW; performing step S504 if it is determined that the color coordinate value of the corresponding point is located in the region divided by RBW; otherwise performing step S505;

S504, determining that the corresponding point is located in the region divided by RGW;

S505, determining that the corresponding point is located in the region divided by GBW.

In particular, deciding whether the color coordinate value of the corresponding point is located in the triangle region divided by RGW in the step 501 can be realized in the following modes:

(1) in an area method: triangle areas $S_{ARG}$, $S_{ARW}$, $S_{AGW}$, and $S_{RGW}$ formed by ARG, ARW, AGW and RGW are calculated respectively by denoting the corresponding point as A, when it is determined that $S_{ARG}+S_{AGW}+S_{ARW}=S_{RGW}$, it can be determined that the corresponding A is located in the region divided by RGW; when it is determined that $S_{ARG}+S_{AGW}+S_{ARW}\neq S_{RGW}$, it can be determined that the corresponding A is located outside the region divided by RGW.

(2) in an interior angle sum method: angles ∠RAW, ∠RAG and ∠GAW are calculated respectively by denoting the corresponding point as A, when it is determined that ∠RAW+∠RAG+∠GAW=360°, it can be determined that the corresponding A is located in the region divided by RGW; when it is determined that ∠RAW+∠RAG+∠GAW≠360°, it can be determined that the corresponding A is located outside the region divided by RGW.

(3) in a same direction method: it is determined which side of each of the rays RC; GW and WR the point A is located respectively by denoting the corresponding point as A, wherein it is determined that the corresponding A is located in the region divided by RGW when it is determined that the corresponding A is located on the different sides of the rays RC; GW and WR respectively, and it is determined that the corresponding A is located outside the region divided by RGW when it is determined that the corresponding A is located on the same side of the rays RG, GW and WR respectively.

The above three methods for deciding whether the color coordinate value of the corresponding point is located in the triangle region divided by RGW in the step 501 are only for illustration, and in practice, other methods can be used to decide the position relationship between the corresponding point and the triangle region, and the details are omitted.

Similarly, the above three methods can also be used to decide whether the color coordinate value of the corresponding point is located in the region divided by RBW in the step 503, and the details are omitted.

After determining which region is the region where the color coordinate value of the corresponding point is located in the step S302, the step S303 is performed, which comprises three cases as follows: when it is determined that the corresponding point is located in the region divided by RGW, the luminance output value of the blue in the RGBW luminance output values is set as zero; when it is determined that the corresponding point is located in the region divided by RBW, the luminance output value of the green in the RGBW luminance output values is set as zero; when it is determined that the corresponding point is located in the region divided by GBW, the luminance output value of the red in the RGBW luminance output values is set as zero; that is, a certain luminance output value in the RGBW luminance output values is set as zero, which can decrease the power consumption of the display effectively while ensuring that the image cannot be distorted, thus improving the lifespan of the display significantly. Further, there are only three active luminance output values in the RGBW luminance output values, compared to the case of the four active luminance output values, which can reduce the power supplied to the display effectively, and thus reduce the cost in use.

Specifically, in the step S303, the RGBW luminance output values are determined respectively according to the determined position relationship, the pre-set luminance adjustment coefficient, the color coordinate value and the luminance value of the corresponding point, and there are three cases as follows:

(1) when it is determined that the corresponding point is located within the region divided by RGW, the RGBW luminance output values are calculated according to the following equations:

$$L_{R'} = \frac{\left(\frac{x}{y} - \frac{x_w}{y_w}\right) - \frac{\left(\frac{x_g}{y_g} - \frac{x_w}{y_w}\right) \times \left(1 - \frac{y}{y_w}\right)}{\frac{y}{y_g} - \frac{y}{y_w}}}{\frac{x_r}{y_r} - \frac{x_w}{y_w} - \frac{\left(\frac{1}{y_r} - \frac{1}{y_w}\right) \times \left(\frac{x_g}{y_g} - \frac{x_w}{y_w}\right)}{\frac{1}{y_g} - \frac{1}{y_w}}} \times K \times L_A$$

$$L_{G'} = \frac{\left(1 - \frac{y}{y_w}\right) - \left(\frac{y}{y_r} - \frac{y}{y_w}\right) \times \frac{\left(\frac{x}{y} - \frac{x_w}{y_w}\right) - \frac{\left(\frac{x_g}{y_g} - \frac{x_w}{y_w}\right) \times \left(1 - \frac{y}{y_w}\right)}{\frac{y}{y_g} - \frac{y}{y_w}}}{\frac{x_r}{y_r} - \frac{x_w}{y_w} - \frac{\left(\frac{1}{y_r} - \frac{1}{y_w}\right) \times \left(\frac{x_g}{y_g} - \frac{x_w}{y_w}\right)}{\frac{1}{y_g} - \frac{1}{y_w}}}}{\frac{y}{y_g} - \frac{y}{y_w}} \times K \times L_A$$

$$L_{W'} = K \times L_A - L_{R'} - L_{G'}$$

$$L_{B'} = 0$$

wherein, $L_{G'}$ represents the luminance output value of the green in the RGBW luminance output values, $L_{B'}$ represents the luminance output value of the blue in the RGBW luminance output values, $L_{R'}$ represents the luminance output value of the red in the RGBW luminance output values, and $L_{W'}$ represents the luminance output value of the white in the RGBW luminance output values; $L_A$ represents the luminance value of the corresponding point; K represents the luminance adjustment coefficient; (x, y) represents the color coordinate value of the corresponding point in the chromaticity diagram; $(x_r, y_r)$ represents the color coordinate value of the red in the chromaticity diagram, $(x_g, y_g)$ represents the color coordinate value of the green in the chromaticity diagram, and $(x_w, y_w)$ represents the color coordinate value of the white in the chromaticity diagram.

(2) when it is determined that the corresponding point is located within the region divided by RBW, the RGBW luminance output values are calculated according to the following equations:

$$L_{R'} = \frac{\left(\frac{x}{y} - \frac{x_w}{y_w}\right) - \frac{\left(\frac{x_b}{y_b} - \frac{x_w}{y_w}\right) \times \left(1 - \frac{y}{y_w}\right)}{\frac{y}{y_b} - \frac{y}{y_w}}}{\frac{x_r}{y_r} - \frac{x_w}{y_w} - \frac{\left(\frac{1}{y_r} - \frac{1}{y_w}\right) \times \left(\frac{x_b}{y_b} - \frac{x_w}{y_w}\right)}{\frac{1}{y_b} - \frac{1}{y_w}}} \times K \times L_A$$

$$L_{B'} = \frac{\left(1 - \frac{y}{y_w}\right) - \left(\frac{y}{y_r} - \frac{y}{y_w}\right) \times \frac{\left(\frac{x}{y} - \frac{x_w}{y_w}\right) - \frac{\left(\frac{x_b}{y_b} - \frac{x_w}{y_w}\right) \times \left(1 - \frac{y}{y_w}\right)}{\frac{y}{y_b} - \frac{y}{y_w}}}{\frac{x_r}{y_r} - \frac{x_w}{y_w} - \frac{\left(\frac{1}{y_r} - \frac{1}{y_w}\right) \times \left(\frac{x_b}{y_b} - \frac{x_w}{y_w}\right)}{\frac{1}{y_b} - \frac{1}{y_w}}}}{\frac{y}{y_b} - \frac{y}{y_w}} \times K \times L_A$$

$$L_{W'} = K \times L_A - L_{R'} - L_{B'}$$

$$L_{G'} = 0$$

wherein, $L_{G'}$ represents the luminance output value of the green in the RGBW luminance output values, $L_{B'}$ represents the luminance output value of the blue in the RGBW luminance output values, $L_{R'}$ represents the luminance output value of the red in the RGBW luminance output values, and $L_{W'}$ represents the luminance output value of the white in the RGBW luminance output values; $L_A$ represents the luminance value of the corresponding point; K represents the luminance adjustment coefficient; (x, y) represents the color coordinate value of the corresponding point in the chromaticity diagram; $(x_r, y_r)$ represents the color coordinate value of the red in the chromaticity diagram, $(x_b, y_b)$ represents the color coordinate value of the blue in the chromaticity diagram, and $(x_w, y_w)$ represents the color coordinate value of the white in the chromaticity diagram.

(3) when it is determined that the corresponding point is located within the region divided by GBW, the RGBW luminance output values are calculated according to the following equations:

$$L_{G'} = \frac{\left(\frac{x}{y} - \frac{x_w}{y_w}\right) - \frac{\left(\frac{x_b}{y_b} - \frac{x_w}{y_w}\right) \times \left(1 - \frac{y}{y_w}\right)}{\frac{y}{y_b} - \frac{y}{y_w}}}{\frac{x_g}{y_g} - \frac{x_w}{y_w} - \frac{\left(\frac{1}{y_g} - \frac{1}{y_w}\right) \times \left(\frac{x_b}{y_b} - \frac{x_w}{y_w}\right)}{\frac{1}{y_b} - \frac{1}{y_w}}} \times K \times L_A$$

$$L_{B'} = \frac{\left(1 - \frac{y}{y_w}\right) - \left(\frac{y}{y_g} - \frac{y}{y_w}\right) \times \frac{\left(\frac{x}{y} - \frac{x_w}{y_w}\right) - \frac{\left(\frac{x_b}{y_b} - \frac{x_w}{y_w}\right) \times \left(1 - \frac{y}{y_w}\right)}{\frac{y}{y_b} - \frac{y}{y_w}}}{\frac{x_g}{y_g} - \frac{x_w}{y_w} - \frac{\left(\frac{1}{y_g} - \frac{1}{y_w}\right) \times \left(\frac{x_b}{y_b} - \frac{x_w}{y_w}\right)}{\frac{1}{y_b} - \frac{1}{y_w}}}}{\frac{y}{y_b} - \frac{y}{y_w}} \times K \times L_A$$

$$L_{W'} = K \times L_A - L_{G'} - L_{B'}$$

$$L_{R'} = 0$$

wherein, $L_{G'}$ represents the luminance output value of the green in the RGBW luminance output values, $L_{B'}$ represents the luminance output value of the blue in the RGBW luminance output values, $L_{R'}$ represents the luminance output value of the red in the RGBW luminance output values, and $L_{W'}$ represents the luminance output value of the white in the RGBW luminance output values; $L_A$ represents the luminance value of the corresponding point; K represents the luminance adjustment coefficient; (x, y) represents the color coordinate value of the corresponding point in the chromaticity diagram; $(x_g, y_g)$ represents the color coordinate value of the green in the chromaticity diagram, $(x_b, y_b)$ represents the color coordinate value of the blue in the chromaticity diagram, and $(x_w, y_w)$ represents the color coordinate value of the white in the chromaticity diagram.

In practice, the above calculation equations can be used to calculate the RGBW luminance output values respectively in the three cases, other equations can be used to compute the RGBW luminance output values in the above three cases, and there is no limitation on this.

In particular, in the step S103 in the method for image conversion provided in the embodiment of the present disclosure, the determined RGBW luminance output values are converted into the corresponding RGBW output signals respectively and the RGBW output signals are outputted, which can be realized in an inverse gamma conversion mode, that is, the RGBW luminance output values are converted into the corresponding RGBW output signals respectively by means of the following equations:

$$R_0 = \left(\frac{L_{R'}}{L_{Rmax}}\right)^{\frac{1}{\gamma}} \times 255; \quad G_0 = \left(\frac{L_{G'}}{L_{Gmax}}\right)^{\frac{1}{\gamma}} \times 255;$$

$$B_0 = \left(\frac{L_{B'}}{L_{Bmax}}\right)^{\frac{1}{\gamma}} \times 255; \quad W_0 = \left(\frac{L_{W'}}{L_{Wmax}}\right)^{\frac{1}{\gamma}} \times 255;$$

wherein, $L_{R'}$ represents the luminance output value of the red in the RGBW luminance output values, $L_{G'}$ represents the luminance output value of the green in the RGBW luminance output values, $L_{B'}$ represents the luminance output value of the blue in the RGBW luminance output values, and $L_{W'}$ represents the luminance output value of the white in the RGBW luminance output values; $R_o$ represents the output signal value of the red in the RGBW output signals, $G_o$ represents the output signal value of the green in the RGBW output signals, $B_o$ represents the output signal value of the blue in the RGBW output signals, and $W_o$ represents the output signal value of the white in the RGBW output signals; $L_{Rmax}$ represents the maximum luminance value of the red, $L_{Gmax}$ represents the maximum luminance value of the green, $L_{Bmax}$ represents the maximum luminance value of the blue, and $L_{Wmax}$ represents the maximum luminance value of the white; γ represents the gamma conversion factor.

Generally, in the specific computation, the gamma conversion factor γ is normally set as 2.2.

Based on the same inventive concept, in an embodiment of the present disclosure, there is further provided a device for image conversion from RGB signals into RGBW signals; since the principle of the device for solving the technical problem thereof is similar to that of the method for image conversion from RGB signals into RGBW signals as described above, the implementation of the device can be referred to the implementation of the method, and the details are omitted.

Figure 6:
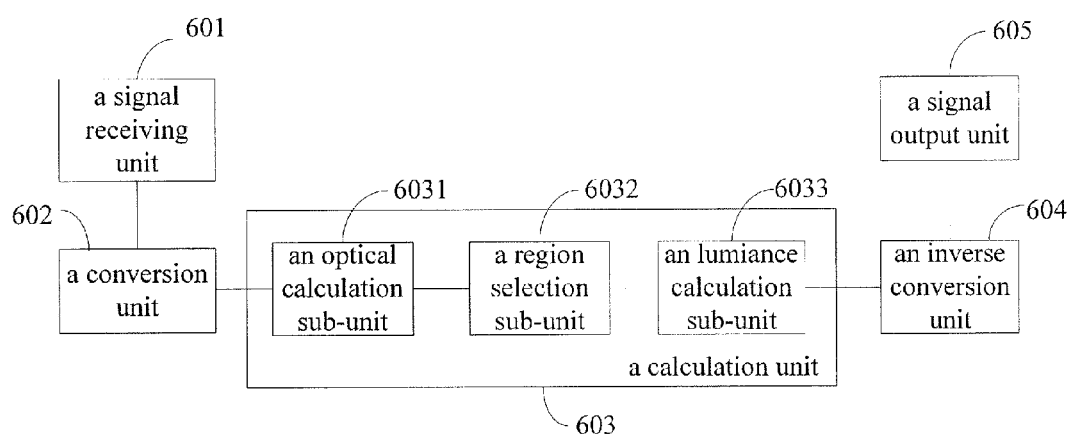
FIG. 6 is a schematic diagram illustrating a structure of a device for image conversion from RGB signals into RGBW signals provided in an embodiment of the present disclosure.

As shown in FIG. 6, the device for image conversion from RGB signals into RGBW signals provided in the embodiment of the present disclosure comprises:

a signal receiving unit 601 for receiving RGB input signals;

a conversion unit 602 for converting the received RGB input signals into corresponding RGB luminance input values respectively;

a calculation unit 603 for determining RGBW luminance output values respectively according to a position relationship between a corresponding point of the RGB luminance input values and the regions divided by RGBW in a chromaticity diagram;

an inverse conversion unit 604 for converting the determined RGBW luminance output values into corresponding RGBW output signals respectively; and a signal output unit 605 for outputting the RGBW output signals.

Further, as shown in FIG. 6, the calculation unit 603 in the device for image conversion provided in the embodiment of the present disclosure particularly comprises:

an optical calculation sub-unit 6031 for determining the color coordinate value and the luminance value of the corresponding point of the RGB luminance input values in the chromaticity diagram;

a region selection sub-unit 6032 for determining the position relationship between the corresponding point and the region divided by RGW, the region divided by RBW, and the region divided by GBW in the chromaticity diagram according to the color coordinate value of the corresponding point; and an luminance calculation sub-unit 6033 for determining the RGBW luminance output values respectively according to the determined position relationship, a preset luminance adjustment coefficient, the color coordinate value and the luminance value of the corresponding point.

Further, the region selection sub-unit 6032 is particularly used for: deciding whether the color coordinate value of the corresponding point is located in the region divided by RGW in the chromaticity diagram; determining that the corresponding point is located in the region divided by RGW when it is determined that the color coordinate value of the corresponding point is located within the region divided by RGW; deciding whether the color coordinate value of the corresponding point is located in the region divided by RBW when it is determined that the color coordinate value of the corresponding point is located outside the region divided by RGW; determining that the corresponding point is located in the region divided by RBW if it is determined that the color coordinate value of the corresponding point is located within the region divided by RBW, otherwise, determining that the corresponding point is located in the region divided by GBW.

Further, the luminance calculation sub-unit 6033 is particularly used for: setting the luminance output value of the blue in the RGBW luminance output values as zero when it is determined that the corresponding point is located in the region divided by RGW; when setting the luminance output value of the green in the RGBW luminance output values as zero it is determined that the corresponding point is located in the region divided by RBW; setting the luminance output value of the red in the RGBW luminance output values as zero when it is determined that the corresponding point is located in the region divided by GBW.

Further, the luminance calculation sub-unit 6033 is particularly used for calculating the RGBW luminance output values according to the following equations when it is determined that the corresponding point is located within the region divided by RGW:

$$L_{R'} = \frac{\left(\frac{x}{y} - \frac{x_w}{y_w}\right) - \frac{\left(\frac{x_g}{y_g} - \frac{x_w}{y_w}\right) \times \left(1 - \frac{y}{y_w}\right)}{\frac{y}{y_g} - \frac{y}{y_w}}}{\frac{x_r}{y_r} - \frac{x_w}{y_w} - \frac{\left(\frac{1}{y_r} - \frac{1}{y_w}\right) \times \left(\frac{x_g}{y_g} - \frac{x_w}{y_w}\right)}{\frac{1}{y_g} - \frac{1}{y_w}}} \times K \times L_A$$

$$L_{G'} = \left(1 - \frac{y}{y_w}\right) - \left(\frac{y}{y_r} - \frac{y}{y_w}\right) \times \frac{\left(\frac{x}{y} - \frac{x_w}{y_w}\right) - \frac{\left(\frac{x_g}{y_g} - \frac{x_w}{y_w}\right) \times \left(1 - \frac{y}{y_w}\right)}{\frac{y}{y_g} - \frac{y}{y_w}}}{\frac{x_r}{y_r} - \frac{x_w}{y_w} - \frac{\left(\frac{1}{y_r} - \frac{1}{y_w}\right) \times \left(\frac{x_g}{y_g} - \frac{x_w}{y_w}\right)}{\frac{1}{y_g} - \frac{1}{y_w}}} \bigg/ \left(\frac{y}{y_g} - \frac{y}{y_w}\right) \times K \times L_A$$

$$L_{W'} = K \times L_A - L_{R'} - L_{G'}$$

$$L_{B'} = 0$$

wherein, $L_{G'}$ represents the luminance output value of the green in the RGBW luminance output values, $L_{B'}$ represents the luminance output value of the blue in the RGBW luminance output values, $L_{R'}$ represents the luminance output value of the red in the RGBW luminance output values, and $L_{W'}$ represents the luminance output value of the white in the RGBW luminance output values; $L_A$ represents the luminance value of the corresponding point; K represents the luminance adjustment coefficient; (x, y) represents the color coordinate value of the corresponding point in the chromaticity diagram; $(x_r, y_r)$ represents the color coordinate value of the red in the chromaticity diagram, $(x_g, y_g)$ represents the color coordinate value of the green in the chromaticity diagram, and $(x_w, y_w)$ represents the color coordinate value of the white in the chromaticity diagram.

Further, the luminance calculation sub-unit 6033 is particularly used for calculating the RGBW luminance output values according to the following equations when it is determined that the corresponding point is located within the region divided by RBW:

$$L_{R'} = \frac{\left(\frac{x}{y} - \frac{x_w}{y_w}\right) - \frac{\left(\frac{x_b}{y_b} - \frac{x_w}{y_w}\right) \times \left(1 - \frac{y}{y_w}\right)}{\frac{y}{y_b} - \frac{y}{y_w}}}{\frac{x_r}{y_r} - \frac{x_w}{y_w} - \frac{\left(\frac{1}{y_r} - \frac{1}{y_w}\right) \times \left(\frac{x_b}{y_b} - \frac{x_w}{y_w}\right)}{\frac{1}{y_b} - \frac{1}{y_w}}} \times K \times L_A$$

$$L_{B'} =$$

$$\frac{\left(1 - \frac{y}{y_w}\right) - \left(\frac{y}{y_r} - \frac{y}{y_w}\right) \times \frac{\left(\frac{x}{y} - \frac{x_w}{y_w}\right) - \frac{\left(\frac{x_b}{y_b} - \frac{x_w}{y_w}\right) \times \left(1 - \frac{y}{y_w}\right)}{\frac{y}{y_b} - \frac{y}{y_w}}}{\frac{x_r}{y_r} - \frac{x_w}{y_w} - \frac{\left(\frac{1}{y_r} - \frac{1}{y_w}\right) \times \left(\frac{x_b}{y_b} - \frac{x_w}{y_w}\right)}{\frac{1}{y_b} - \frac{1}{y_w}}}}{\frac{y}{y_b} - \frac{y}{y_w}} \times K \times L_A$$

$$L_{W'} = K \times L_A - L_{R'} - L_{B'}$$

$$L_{G'} = 0$$

wherein, $L_{G'}$ represents the luminance output value of the green in the RGBW luminance output values, $L_{B'}$ represents the luminance output value of the blue in the RGBW luminance output values, $L_{R'}$ represents the luminance output value of the red in the RGBW luminance output values, and $L_{W'}$ represents the luminance output value of the white in the RGBW luminance output values; $L_A$ represents the luminance value of the corresponding point; K represents the luminance adjustment coefficient; (x, y) represents the color coordinate value of the corresponding point in the chromaticity diagram; $(x_r, y_r)$ represents the color coordinate value of the red in the chromaticity diagram, $(x_b, y_b)$ represents the color coordinate value of the blue in the chromaticity diagram, and $(x_w, y_w)$ represents the color coordinate value of the white in the chromaticity diagram.

Further, the luminance calculation sub-unit 6033 is particularly used for calculating the RGBW luminance output values according to the following equations when it is determined that the corresponding point is located within the region divided by GBW:

$$L_{G'} = \frac{\left(\frac{x}{y} - \frac{x_w}{y_w}\right) - \frac{\left(\frac{x_b}{y_b} - \frac{x_w}{y_w}\right) \times \left(1 - \frac{y}{y_w}\right)}{\frac{y}{y_b} - \frac{y}{y_w}}}{\frac{x_g}{y_g} - \frac{x_w}{y_w} - \frac{\left(\frac{1}{y_g} - \frac{1}{y_w}\right) \times \left(\frac{x_b}{y_b} - \frac{x_w}{y_w}\right)}{\frac{1}{y_b} - \frac{1}{y_w}}} \times K \times L_A$$

$$L_{B'} =$$

$$\frac{\left(1 - \frac{y}{y_w}\right) - \left(\frac{y}{y_g} - \frac{y}{y_w}\right) \times \frac{\left(\frac{x}{y} - \frac{x_w}{y_w}\right) - \frac{\left(\frac{x_b}{y_b} - \frac{x_w}{y_w}\right) \times \left(1 - \frac{y}{y_w}\right)}{\frac{y}{y_b} - \frac{y}{y_w}}}{\frac{x_g}{y_g} - \frac{x_w}{y_w} - \frac{\left(\frac{1}{y_g} - \frac{1}{y_w}\right) \times \left(\frac{x_b}{y_b} - \frac{x_w}{y_w}\right)}{\frac{1}{y_b} - \frac{1}{y_w}}}}{\frac{y}{y_b} - \frac{y}{y_w}} \times K \times L_A$$

$$L_{W'} = K \times L_A - L_{G'} - L_{B'}$$

$$L_{R'} = 0$$

wherein, $L_{G'}$ represents the luminance output value of the green in the RGBW luminance output values, $L_{B'}$ represents the luminance output value of the blue in the RGBW luminance output values, $L_{R'}$ represents the luminance output value of the red in the RGBW luminance output values, and $L_{W'}$ represents the luminance output value of the white in the RGBW luminance output values; $L_A$ represents the luminance value of the corresponding point; K represents the luminance adjustment coefficient; (x, y) represents the color coordinate value of the corresponding point in the chromaticity diagram; $(x_g, y_g)$ represents the color coordinate value of the green in the chromaticity diagram, $(x_b, y_b)$ represents the color coordinate value of the blue in the chromaticity diagram, and $(x_w, y_w)$ represents the color coordinate value of the white in the chromaticity diagram.

Further, the optical calculation sub-unit 6031 is particularly used for calculating the color coordinate value and the luminance value of the corresponding point of the RGB luminance input values by means of the following equations:

$$L_A = L_R + L_G + L_B$$

$$x = \frac{x_r \times \frac{L_R}{y_r} + x_g \times \frac{L_G}{y_g} + x_b \times \frac{L_B}{y_b}}{\frac{L_R}{y_r} + \frac{L_G}{y_g} + \frac{L_B}{y_b}}$$

$$y = \frac{L_R + L_G + L_B}{\frac{L_R}{y_r} + \frac{L_G}{y_g} + \frac{L_B}{y_b}}$$

wherein, $L_A$ represents the luminance value of the corresponding point; $L_G$ represents the luminance input value of the green in the RGB luminance input values, $L_B$ represents the luminance input value of the blue in the RGB luminance input values, and $L_R$ represents the luminance input value of the red in the RGB luminance input values; (x, y) represents the color coordinate value of the corresponding point in the chromaticity diagram; $(x_r, y_r)$ represents the color coordinate value of the red in the chromaticity diagram, $(x_g, y_g)$ represents the color coordinate value of the green in the chromaticity diagram, and $(x_b, y_b)$ represents the color coordinate value of the blue in the chromaticity diagram.

Further, the conversion unit 602 in the device for image conversion provided in the embodiment of the present disclosure is particularly used for converting the RGB input signals into the corresponding RGB luminance input values respectively by the following equations:

$$L_R = L_{Rmax} \times \left(\frac{Ri}{255}\right)^{\gamma}; \; L_G = L_{Gmax} \times \left(\frac{Gi}{255}\right)^{\gamma}; \; L_B = L_{Bmax} \times \left(\frac{Bi}{255}\right)^{\gamma};$$

wherein, $L_R$ represents the luminance input value of the red in the RGB luminance input values, $L_G$ represents the luminance input value of the green in the RGB luminance input values, and $L_B$ represents the luminance input value of the blue in the RGB luminance input values; Ri represents the input signal value of the red in the RGB input signals, Gi represents the input signal value of the green in the RGB input signals, and Bi represents the input signal value of the blue in the RGB input signals; $L_{Rmax}$ represents the maximum luminance value of the red, $L_{Gmax}$ represents the maximum luminance value of the green, and $L_{Bmax}$ represents the maximum luminance value of the blue; $\gamma$ represents a gamma conversion factor.

Further, the inverse conversion unit 604 in the device for image conversion provided in the embodiment of the present disclosure is particularly used for converting the RGBW luminance output values into the corresponding RGBW output signals respectively by means of the following equations:

$$R_0 = \left(\frac{L_{R'}}{L_{Rmax}}\right)^{\frac{1}{\gamma}} \times 255;$$

$$G_0 = \left(\frac{L_{G'}}{L_{Gmax}}\right)^{\frac{1}{\gamma}} \times 255;$$

$$B_0 = \left(\frac{L_{B'}}{L_{Bmax}}\right)^{\frac{1}{\gamma}} \times 255;$$

$$W_0 = \left(\frac{L_{W'}}{L_{Wmax}}\right)^{\frac{1}{\gamma}} \times 255;$$

wherein, $L_{R'}$ represents the luminance output value of the red in the RGBW luminance output values, $L_{G'}$ represents the luminance output value of the green in the RGBW luminance output values, $L_{B'}$ represents the luminance output value of the blue in the RGBW luminance output values, and $L_{W'}$ represents the luminance output value of the white in the RGBW luminance output values; $R_o$ represents the output signal value of the red in the RGBW output signals, $G_o$ represents the output signal value of the green in the RGBW output signals, $B_o$ represents the output signal value of the blue in the RGBW output signals, and $W_o$ represents the output signal value of the white in the RGBW output signals; $L_{Rmax}$ represents the maximum luminance value of the red, $L_{Gmax}$ represents the maximum luminance value of the green, $L_{Bmax}$ represents the maximum luminance value of the blue, and $L_{Wmax}$ represents the maximum luminance value of the white; $\gamma$ represents the gamma conversion factor.

Based on the descriptions for the embodiments of the present disclosures, it is appreciated for those skilled in the art that the embodiments of the present disclosure not only can be implemented by means of hardware, but also can be implemented by means of software in combination with the general hardware platform as necessary. In view of the above, the technical solutions of the present disclosure can be embodied in a software product, and the software product can be a nonvolatile storage medium(such as CD-ROM, USB Flash Disk, Portable Hard Disk and the like), which comprises instructions for causing a computer device (such as a personal computer, server, or network device and the like) to perform the method provided in the embodiments of the present disclosure.

Those skilled in the art can appreciate that the accompanying drawings are the schematic diagrams of the optional embodiments, and the modules or flowcharts in the accompanying drawings are not necessary for implementing the present disclosure.

Further, it is conceivable for those skilled in the art that the modules in the device provided in the embodiments of the present invention can be distributed in a device provided in the embodiments of the present disclosure according to the descriptions for the embodiments, and can also be located in one or more devices different from the device provided in the embodiments of the present disclosure with corresponding variations. Further, the modules in the above embodiments can be merged into one module, and can also be further splitted into a plurality of sub-modules.

The sequence number of the embodiment is only for illustration, and does not represent the ranking of the embodiment.

In the method and device for image conversion from RGB signals to RGBW signals provided in the embodiments of the present disclosure, RGB input signals as received are converted into the corresponding RGB luminance input values respectively; the RGBW luminance output values are determined respectively according to the position relationship between the corresponding point of the RGB luminance input values and the regions divided by RGBW in a chromaticity diagram; and the determined RGBW luminance output values are converted into the corresponding RGBW output signals respectively and the RGBW output signals are output. Since the RGB luminance input values are converted into the RGBW luminance output values by determining the corresponding point of the RGB luminance input values in the chromaticity diagram, it can be ensured that color distortion does not occur in the conversion procedure from RGB signals to RGBW signals. Further, when the RGBW luminance output values are determined according to the corresponding point of the RGB luminance input values in the chromaticity diagram, the digital values of the RGBW luminance output values are adjustable as desired, thus improving the luminance of the display device as a whole, and enhancing the image contrast.

It will be obvious that those skilled in the art may make modifications, variations and equivalences to the above embodiments without departing from the spirit and scope of the present disclosure as defined by the following claims. Such variations and modifications are intended to be included within the spirit and scope of the present disclosure as long as the variations and modifications fall into the scopes of the claims as attached and of the equivalent technique.

What is claimed is:

1. A method for image conversion from RGB signals into RGBW signals, comprising:

converting RGB input signals as received into corresponding RGB luminance input values respectively;

determining a color coordinate value and a luminance value of the corresponding point of the RGB luminance input values in the chromaticity diagram;

determining a position relationship between the corresponding point and a region divided by RGW, a region divided by RBW, and a region divided by GBW in the chromaticity diagram according to the color coordinate value of the corresponding point;

determining the RGBW luminance output values respectively according to the determined position relationship, a preset luminance adjustment coefficient, the color coordinate value and the luminance value of the corresponding point;

converting the determined RGBW luminance output values into corresponding RGBW output signals and outputting the RGBW output signals respectively, said determining the RGBW luminance output values respectively according to the determined position relationship, a preset luminance adjustment coefficient, the color coordinate value and the luminance value of the corresponding point comprises:

setting the luminance output value of the blue in the RGBW luminance output values as zero when it is determined that the corresponding point is located in the region divided by RGW;

setting the luminance output value of the green in the RGBW luminance output values as zero when it is determined that the corresponding point is located in the region divided by RBW; and setting the luminance output value of the red in the RGBW luminance output values as zero when it is determined that the corresponding point is located in the region divided by GBW.

2. The method of claim 1, wherein said determining the position relationship between the corresponding point and the region divided by RGW, the region divided by RBW, and the region divided by GBW in the chromaticity diagram according to the color coordinate value of the corresponding point particularly comprises:

deciding whether the color coordinate value of the corresponding point is located in the region divided by RGW in the chromaticity diagram;

determining that the corresponding point is located in the region divided by RGW when it is determined that the color coordinate value of the corresponding point is located within the region divided by RGW;

deciding whether the color coordinate value of the corresponding point is located in the region divided by RBW when it is determined that the color coordinate value of the corresponding point is located outside the region divided by RGW;

determining that the corresponding point is located in the region divided by RBW if it is determined that the color coordinate value of the corresponding point is located in the region divided by RBW; otherwise determining that the corresponding point is located in the region divided by GBW.

3. The method of claim 1, wherein said determining the RGBW luminance output values respectively according to the determined position relationship, the preset luminance adjustment coefficient, the color coordinate value and the luminance value of the corresponding point comprises:

when it is determined that the corresponding point is located within the region divided by RGW, calculating the RGBW luminance output values according to the following equations:

$$L_{R'} = \frac{\left(\frac{x}{y} - \frac{x_w}{y_w}\right) - \frac{\left(\frac{x_g}{y_g} - \frac{x_w}{y_w}\right) \times \left(1 - \frac{y}{y_w}\right)}{\frac{y}{y_g} - \frac{y}{y_w}}}{\frac{x_r}{y_r} - \frac{x_w}{y_w} - \frac{\left(\frac{1}{y_r} - \frac{1}{y_w}\right) \times \left(\frac{x_g}{y_g} - \frac{x_w}{y_w}\right)}{\frac{1}{y_g} - \frac{1}{y_w}}} \times K \times L_A$$

$$L_{G'} = \frac{\left(1 - \frac{y}{y_w}\right) - \left(\frac{y}{y_r} - \frac{y}{y_w}\right) \times \frac{\left(\frac{x}{y} - \frac{x_w}{y_w}\right) - \frac{\left(\frac{x_g}{y_g} - \frac{x_w}{y_w}\right) \times \left(1 - \frac{y}{y_w}\right)}{\frac{y}{y_g} - \frac{y}{y_w}}}{\frac{x_r}{y_r} - \frac{x_w}{y_w} - \frac{\left(\frac{1}{y_r} - \frac{1}{y_w}\right) \times \left(\frac{x_g}{y_g} - \frac{x_w}{y_w}\right)}{\frac{1}{y_g} - \frac{1}{y_w}}}}{\frac{y}{y_g} - \frac{y}{y_w}} \times K \times L_A$$

$$L_{W'} = K \times L_A - L_{R'} - L_{G'}$$

$$L_{B'} = 0$$

wherein, $L_{G'}$ represents the luminance output value of the green in the RGBW luminance output values, $L_{B'}$ represents the luminance output value of the blue in the RGBW luminance output values, $L_{R'}$ represents the luminance output value of the red in the RGBW luminance output values, and $L_{W'}$ represents the luminance output value of the white in the RGBW luminance output values; $L_A$ represents the luminance value of the corresponding point; K represents the luminance adjustment coefficient; (x, y) represents the color coordinate value of the corresponding point in the chromaticity diagram; $(x_r, y_r)$ represents the color coordinate value of the red in the chromaticity diagram, $(x_g, y_g)$ represents the color coordinate value of the green in the chromaticity diagram, and $(x_w, y_w)$ represents the color coordinate value of the white in the chromaticity diagram.

4. The method of claim 1, wherein said determining the RGBW luminance output values respectively according to the determined position relationship, the preset luminance adjustment coefficient, the color coordinate value and the luminance value of the corresponding point comprises:

when it is determined that the corresponding point is located within the region divided by RBW, calculating the RGBW luminance output values according to the following equations:

$$L_{R'} = \frac{\left(\frac{x}{y} - \frac{x_w}{y_w}\right) - \frac{\left(\frac{x_b}{y_b} - \frac{x_w}{y_w}\right) \times \left(1 - \frac{y}{y_w}\right)}{\frac{y}{y_b} - \frac{y}{y_w}}}{\frac{x_r}{y_r} - \frac{x_w}{y_w} - \frac{\left(\frac{1}{y_r} - \frac{1}{y_w}\right) \times \left(\frac{x_b}{y_b} - \frac{x_w}{y_w}\right)}{\frac{1}{y_b} - \frac{1}{y_w}}} \times K \times L_A$$

$$L_{B'} = \frac{\left(1 - \frac{y}{y_w}\right) - \left(\frac{y}{y_r} - \frac{y}{y_w}\right) \times \frac{\left(\frac{x}{y} - \frac{x_w}{y_w}\right) - \frac{\left(\frac{x_b}{y_b} - \frac{x_w}{y_w}\right) \times \left(1 - \frac{y}{y_w}\right)}{\frac{y}{y_b} - \frac{y}{y_w}}}{\frac{x_r}{y_r} - \frac{x_w}{y_w} - \frac{\left(\frac{1}{y_r} - \frac{1}{y_w}\right) \times \left(\frac{x_b}{y_b} - \frac{x_w}{y_w}\right)}{\frac{1}{y_b} - \frac{1}{y_w}}}}{\frac{y}{y_b} - \frac{y}{y_w}} \times K \times L_A$$

-continued $$L_{W'} = K \times L_A - L_{R'} - L_{B'}$$
$$L_{G'} = 0$$

wherein, $L_{G'}$ represents the luminance output value of the green in the RGBW luminance output values, $L_{B'}$ represents the luminance output value of the blue in the RGBW luminance output values, $L_{R'}$ represents the luminance output value of the red in the RGBW luminance output values, and $L_{W'}$ represents the luminance output value of the white in the RGBW luminance output values; $L_A$ represents the luminance value of the corresponding point; K represents the luminance adjustment coefficient; (x, y) represents the color coordinate value of the corresponding point in the chromaticity diagram; $(x_r, y_r)$ represents the color coordinate value of the red in the chromaticity diagram, $(x_b, y_b)$ represents the color coordinate value of the blue in the chromaticity diagram, and $(x_w, y_w)$ represents the color coordinate value of the white in the chromaticity diagram.

5. The method of claim 1, wherein said determining the RGBW luminance output values respectively according to the determined position relationship, the preset luminance adjustment coefficient, the color coordinate value and the luminance value of the corresponding point comprises:
when it is determined that the corresponding point is located within the region divided by GBW, calculating the RGBW luminance output values according to the following equations:

$$L_{G'} = \frac{\left(\frac{x}{y} - \frac{x_w}{y_w}\right) - \frac{\left(\frac{x_b}{y_b} - \frac{x_w}{y_w}\right) \times \left(1 - \frac{y}{y_w}\right)}{\frac{y}{y_b} - \frac{y}{y_w}}}{\frac{x_g}{y_g} - \frac{x_w}{y_w} - \frac{\left(\frac{1}{y_g} - \frac{1}{y_w}\right) \times \left(\frac{x_b}{y_b} - \frac{x_w}{y_w}\right)}{\frac{1}{y_b} - \frac{1}{y_w}}} \times K \times L_A$$

$$L_{B'} = \frac{\left(1 - \frac{y}{y_w}\right) - \left(\frac{y}{y_g} - \frac{y}{y_w}\right) \times \frac{\left(\frac{x}{y} - \frac{x_w}{y_w}\right) - \frac{\left(\frac{x_b}{y_b} - \frac{x_w}{y_w}\right) \times \left(1 - \frac{y}{y_w}\right)}{\frac{y}{y_b} - \frac{y}{y_w}}}{\frac{x_g}{y_g} - \frac{x_w}{y_w} - \frac{\left(\frac{1}{y_g} - \frac{1}{y_w}\right) \times \left(\frac{x_b}{y_b} - \frac{x_w}{y_w}\right)}{\frac{1}{y_b} - \frac{1}{y_w}}}}{\frac{y}{y_b} - \frac{y}{y_w}} \times K \times L_A$$

$$L_{W'} = K \times L_A - L_{G'} - L_{B'}$$
$$L_{R'} = 0$$

wherein, $L_{G'}$ represents the luminance output value of the green in the RGBW luminance output values, $L_{B'}$ represents the luminance output value of the blue in the RGBW luminance output values, $L_{R'}$ represents the luminance output value of the red in the RGBW luminance output values, and $L_{W'}$ represents the luminance output value of the white in the RGBW luminance output values; $L_A$ represents the luminance value of the corresponding point; K represents the luminance adjustment coefficient; (x, y) represents the color coordinate value of the corresponding point in the chromaticity diagram; $(x_g, y_g)$ represents the color coordinate value of the green in the chromaticity diagram, $(x_b, y_b)$ represents the color coordinate value of the blue in the chromaticity diagram, and $(x_w, y_w)$ represents the color coordinate value of the white in the chromaticity diagram.

6. The method of claim 1, wherein said determining the color coordinate value and the luminance value of the corresponding point of the RGB luminance input values in the chromaticity diagram comprises:
calculating the color coordinate value and the luminance value of the corresponding point of the RGB luminance input values according to the following equations:

$$L_A = L_R + L_G + L_B$$

$$x = \frac{x_r \times \frac{L_R}{y_r} + x_g \times \frac{L_G}{y_g} + x_b \times \frac{L_B}{y_b}}{\frac{L_R}{y_r} + \frac{L_G}{y_g} + \frac{L_B}{y_b}}$$

$$y = \frac{L_R + L_G + L_B}{\frac{L_R}{y_r} + \frac{L_G}{y_g} + \frac{L_B}{y_b}}$$

wherein, $L_A$ represents the luminance value of the corresponding point; $L_G$ represents the luminance input value of the green in the RGB luminance input values, $L_B$ represents the luminance input value of the blue in the RGB luminance input values, and $L_R$ represents the luminance input value of the red in the RGB luminance input values; (x, y) represents the color coordinate value of the corresponding point in the chromaticity diagram; $(x_r, y_r)$ represents the color coordinate value of the red in the chromaticity diagram, $(x_g, y_g)$ represents the color coordinate value of the green in the chromaticity diagram, and $(x_b, y_b)$ represents the color coordinate value of the blue in the chromaticity diagram.

7. The method of claim 1, wherein said converting the RGB input signals as received into the corresponding RGB luminance input values respectively comprises:
converting the RGB input signals into the corresponding RGB luminance input values respectively by the following equations:

$$L_R = L_{Rmax} \times \left(\frac{Ri}{255}\right)^\gamma; L_G = L_{Gmax} \times \left(\frac{Gi}{255}\right)^\gamma; L_B = L_{Bmax} \times \left(\frac{Bi}{255}\right)^\gamma;$$

wherein, $L_R$ represents the luminance input value of the red in the RGB luminance input values, $L_G$ represents the luminance input value of the green in the RGB luminance input values, and $L_B$ represents the luminance input value of the blue in the RGB luminance input values; Ri represents the input signal value of the red in the RGB input signals, Gi represents the input signal value of the green in the RGB input signals, and Bi represents the input signal value of the blue in the RGB input signals; $L_{Rmax}$ represents a maximum luminance value of the red, $L_{Gmax}$ represents a maximum luminance value of the green, and $L_{Bmax}$ represents a maximum luminance value of the blue; γ represents a gamma conversion factor.

8. The method of claim 1, wherein said converting the determined RGBW luminance output values into the corresponding RGBW output signals and outputting the RGBW output signals respectively comprises:

converting the RGBW luminance output values into the corresponding RGBW output signals respectively by the following equations:

$$R_0 = \left(\frac{L_{R'}}{L_{Rmax}}\right)^{\frac{1}{\gamma}} \times 255;\ G_0 = \left(\frac{L_{G'}}{L_{Gmax}}\right)^{\frac{1}{\gamma}} \times 255;$$

$$B_0 = \left(\frac{L_{B'}}{L_{Bmax}}\right)^{\frac{1}{\gamma}} \times 255;\ W_0 = \left(\frac{L_{W'}}{L_{Wmax}}\right)^{\frac{1}{\gamma}} \times 255;$$

wherein, $L_{R'}$ represents the luminance output value of the red in the RGBW luminance output values, $L_{G'}$ represents the luminance output value of the green in the RGBW luminance output values, $L_{B'}$ represents the luminance output value of the blue in the RGBW luminance output values, and $L_{W'}$ represents the luminance output value of the white in the RGBW luminance output values; $R_o$ represents the output signal value of the red in the RGBW output signals, $G_o$ represents the output signal value of the green in the RGBW output signals, $B_o$ represents the output signal value of the blue in the RGBW output signals, and $W_o$ represents the output signal value of the white in the RGBW output signals; $L_{Rmax}$ represents a maximum luminance value of the red, $L_{Gmax}$ represents a maximum luminance value of the green, $L_{Bmax}$ represents a maximum luminance value of the blue, and $L_{Wmax}$ represents a maximum luminance value of the white: $\gamma$ represents a gamma conversion factor.

9. A device for image conversion from RGB signals into RGBW signals, comprising:
   a processor;
   a converter operating on the processor to convert the RGB signals into corresponding RGB luminance input values respectively;
   a calculator operating on the processor to determine RGBW luminance output values respectively according to a position relationship between a corresponding point of the RGB luminance input values and regions divided by RGBW in a chromaticity diagram;
   an inverse converter operating on the processor to convert the determined RGBW luminance output values into corresponding RGBW signals respectively;
   wherein the calculator comprises:
      an optical calculator operating on the processor to determine a color coordinate value and a luminance value of the corresponding point of the RGB luminance input values in the chromaticity diagram;
      a region selector operating on the processor to determine the position relationship between the corresponding point and a region divided by RGW, a region divided by RBW, and a region divided by GBW in the chromaticity diagram according to the color coordinate value of the corresponding point; and
      an luminance calculator operating on the processor to determine the RGBW luminance output values respectively according to the determined position relationship, a preset luminance adjustment coefficient, the color coordinate value and the luminance value of the corresponding point;
   wherein the luminance calculator sets the luminance output value of the blue in the RGBW luminance output values as zero when it is determined that the corresponding point is located in the region divided by RGW; sets the luminance output value of the green in the RGBW luminance output values as zero when it is determined that the corresponding point is located in the region divided by RBW; and sets the luminance output value of the red in the RGBW luminance output values as zero when it is determined that the corresponding point is located in the region divided by GBW.

10. The device of claim 9, wherein the region selector decides whether the color coordinate value of the corresponding point is located in the region divided by RGW in the chromaticity diagram; determines that the corresponding point is located in the region divided by RGW when it is determined that the color coordinate value of the corresponding point is located within the region divided by RGW; decides whether the color coordinate value of the corresponding point is located in the region divided by RBW when it is determined that the color coordinate value of the corresponding point is located outside the region divided by RGW; determines that the corresponding point is located in the region divided by RBW if it is determined that the color coordinate value of the corresponding point is located within the region divided by RBW, otherwise, determines that the corresponding point is located in the region divided by GBW.

11. The device of claim 9, wherein the luminance calculator calculates the RGBW luminance output values according to the following equations when it is determined that the corresponding point is located within the region divided by RGW:

$$L_{R'} = \frac{\left(\frac{x}{y} - \frac{x_w}{y_w}\right) - \frac{\left(\frac{x_g}{y_g} - \frac{x_w}{y_w}\right) \times \left(1 - \frac{y}{y_w}\right)}{\frac{y}{y_g} - \frac{y}{y_w}}}{\frac{x_r}{y_r} - \frac{x_w}{y_w} - \frac{\left(\frac{1}{y_r} - \frac{1}{y_w}\right) \times \left(\frac{x_g}{y_g} - \frac{x_w}{y_w}\right)}{\frac{1}{y_g} - \frac{1}{y_w}}} \times K \times L_A$$

$$L_{G'} =$$

$$\frac{\left(1 - \frac{y}{y_w}\right) - \left(\frac{y}{y_r} - \frac{y}{y_w}\right) \times \frac{\left(\frac{x}{y} - \frac{x_w}{y_w}\right) - \frac{\left(\frac{x_g}{y_g} - \frac{x_w}{y_w}\right) \times \left(1 - \frac{y}{y_w}\right)}{\frac{y}{y_g} - \frac{y}{y_w}}}{\frac{x_r}{y_r} - \frac{x_w}{y_w} - \frac{\left(\frac{1}{y_r} - \frac{1}{y_w}\right) \times \left(\frac{x_g}{y_g} - \frac{x_w}{y_w}\right)}{\frac{1}{y_g} - \frac{1}{y_w}}}}{\frac{y}{y_g} - \frac{y}{y_w}} \times K \times L_A$$

$$L_{W'} = K \times L_A - L_{R'} - L_{G'}$$

$$L_{B'} = 0$$

wherein, $L_{G'}$ represents the luminance output value of the green in the RGBW luminance output values, $L_{B'}$ represents the luminance output value of the blue in the RGBW luminance output values, $L_{R'}$ represents the luminance output value of the red in the RGBW luminance output values, and $L_{W'}$ represents the luminance output value of the white in the RGBW luminance output values; $L_A$ represents the luminance value of the corresponding point; K represents the luminance adjustment coefficient; (x, y) represents the color coordinate value of the corresponding point in the chromaticity diagram; $(x_r, y_r)$ represents the color coordinate value of the red in the chromaticity diagram, $(x_g, y_g)$ represents the color coordinate value of the green in the chromaticity diagram, and $(x_w, y_w)$ represents the color coordinate value of the white in the chromaticity diagram.

12. The device of claim 9, wherein the luminance calculator calculates the RGBW luminance output values according to the following equations when it is determined that the corresponding point is located within the region divided by RBW:

$$L_{R'} = \frac{\left(\frac{x}{y} - \frac{x_w}{y_w}\right) - \frac{\left(\frac{x_b}{y_b} - \frac{x_w}{y_w}\right) \times \left(1 - \frac{y}{y_w}\right)}{\frac{y}{y_b} - \frac{y}{y_w}}}{\frac{x_r}{y_r} - \frac{x_w}{y_w} - \frac{\left(\frac{1}{y_r} - \frac{1}{y_w}\right) \times \left(\frac{x_b}{y_b} - \frac{x_w}{y_w}\right)}{\frac{1}{y_b} - \frac{1}{y_w}}} \times K \times L_A$$

$$L_{B'} = \frac{\left(1 - \frac{y}{y_w}\right) - \left(\frac{y}{y_r} - \frac{y}{y_w}\right) \times \frac{\left(\frac{x}{y} - \frac{x_w}{y_w}\right) - \frac{\left(\frac{x_b}{y_b} - \frac{x_w}{y_w}\right) \times \left(1 - \frac{y}{y_w}\right)}{\frac{y}{y_b} - \frac{y}{y_w}}}{\frac{x_r}{y_r} - \frac{x_w}{y_w} - \frac{\left(\frac{1}{y_v} - \frac{1}{y_w}\right) \times \left(\frac{x_b}{y_b} - \frac{x_w}{y_w}\right)}{\frac{1}{y_b} - \frac{1}{y_w}}}}{\frac{y}{y_b} - \frac{y}{y_w}} \times K \times L_A$$

$$L_{W'} = K \times L_A - L_{R'} - L_{B'}$$

$$L_{G'} = 0$$

wherein, $L_{G'}$ represents the luminance output value of the green in the RGBW luminance output values, $L_{B'}$ represents the luminance output value of the blue in the RGBW luminance output values, $L_{R'}$ represents the luminance output value of the red in the RGBW luminance output values, and $L_{W'}$ represents the luminance output value of the white in the RGBW luminance output values; $L_A$ represents the luminance value of the corresponding point; K represents the luminance adjustment coefficient; (x, y) represents the color coordinate value of the corresponding point in the chromaticity diagram; $(x_r, y_r)$ represents the color coordinate value of the red in the chromaticity diagram, $(x_b, y_b)$ represents the color coordinate value of the blue in the chromaticity diagram, and $(x_w, y_w)$ represents the color coordinate value of the white in the chromaticity diagram.

13. The device of claim 9, wherein the luminance calculator calculates the RGBW luminance output values according to the following equations when it is determined that the corresponding point is located within the region divided by GBW:

$$L_{G'} = \frac{\left(\frac{x}{y} - \frac{x_w}{y_w}\right) - \frac{\left(\frac{x_b}{y_b} - \frac{x_w}{y_w}\right) \times \left(1 - \frac{y}{y_w}\right)}{\frac{y}{y_b} - \frac{y}{y_w}}}{\frac{x_g}{y_g} - \frac{x_w}{y_w} - \frac{\left(\frac{1}{y_g} - \frac{1}{y_w}\right) \times \left(\frac{x_b}{y_b} - \frac{x_w}{y_w}\right)}{\frac{1}{y_b} - \frac{1}{y_w}}} \times K \times L_A$$

$$L_{B'} = \frac{\left(1 - \frac{y}{y_w}\right) - \left(\frac{y}{y_g} - \frac{y}{y_w}\right) \times \frac{\left(\frac{x}{y} - \frac{x_w}{y_w}\right) - \frac{\left(\frac{x_b}{y_b} - \frac{x_w}{y_w}\right) \times \left(1 - \frac{y}{y_w}\right)}{\frac{y}{y_b} - \frac{y}{y_w}}}{\frac{x_g}{y_g} - \frac{x_w}{y_w} - \frac{\left(\frac{1}{y_g} - \frac{1}{y_w}\right) \times \left(\frac{x_b}{y_b} - \frac{x_w}{y_w}\right)}{\frac{1}{y_b} - \frac{1}{y_w}}}}{\frac{y}{y_b} - \frac{y}{y_w}} \times K \times L_A$$

$$L_{W'} = K \times L_A - L_{G'} - L_{B'}$$

$$L_{R'} = 0$$

wherein, $L_{G'}$ represents the luminance output value of the green in the RGBW luminance output values, $L_{B'}$ represents the luminance output value of the blue in the RGBW luminance output values, $L_{R'}$ represents the luminance output value of the red in the RGBW luminance output values, and $L_{W'}$ represents the luminance output value of the white in the RGBW luminance output values; $L_A$ represents the luminance value of the corresponding point; K represents the luminance adjustment coefficient; (x, y) represents the color coordinate value of the corresponding point in the chromaticity diagram; $(x_g, y_g)$ represents the color coordinate value of the green in the chromaticity diagram, $(x_b, y_b)$ represents the color coordinate value of the blue in the chromaticity diagram, and $(x_w, y_w)$ represents the color coordinate value of the white in the chromaticity diagram.

14. The device of claim 9, wherein the optical calculator calculates the color coordinate value and the luminance value of the corresponding point of the RGB luminance input values by means of the following equations:

$$L_A = L_R + L_G + L_B$$

$$x = \frac{x_r \times \frac{L_R}{y_r} + x_g \times \frac{L_G}{y_g} + x_b \times \frac{L_B}{y_b}}{\frac{L_R}{y_r} + \frac{L_G}{y_b} + \frac{L_B}{y_b}}$$

$$y = \frac{L_R + L_G + L_B}{\frac{L_R}{y_r} + \frac{L_G}{y_g} + \frac{L_B}{y_b}}$$

wherein, $L_A$ represents the luminance value of the corresponding point; $L_G$ represents the luminance input value of the green in the RGB luminance input values, $L_B$ represents the luminance input value of the blue in the RGB luminance input values, and $L_R$ represents the luminance input value of the red in the RGB luminance input values; (x, y) represents the color coordinate value of the corresponding point in the chromaticity diagram; $(x_r, y_r)$ represents the color coordinate value of the red in the chromaticity diagram, $(x_g, y_g)$ represents the color coordinate value of the green in the chromaticity diagram, and $(x_b, y_b)$ represents the color coordinate value of the blue in the chromaticity diagram.

15. The device of claim 9, wherein the converter converts the RGB signals into the corresponding RGB luminance input values respectively by the following equations:

$$L_R = L_{Rmax} \times \left(\frac{Ri}{255}\right)^\gamma; L_G = L_{Gmax} \times \left(\frac{Gi}{255}\right)^\gamma; L_B = L_{Bmax} \times \left(\frac{Bi}{255}\right)^\gamma;$$

wherein, $L_R$ represents the luminance input value of the red in the RGB luminance input values, $L_G$ represents the luminance input value of the green in the RGB luminance input values, and $L_B$ represents the luminance input value of the blue in the RGB luminance input values; Ri represents the input signal value of the red in the RGB signals, Gi represents the input signal value of the green in the RGB signals, and Bi represents the input signal value of the blue in the RGB signals; $L_{Rmax}$ represents a maximum luminance value of the red, $L_{Gmax}$ represents a maximum luminance value of the green, and $L_{Bmax}$ represents a maximum luminance value of the blue; $\gamma$ represents a gamma conversion factor.

16. The device of claim 9, wherein the inverse converter converts the RGBW luminance output values into the corresponding RGBW signals respectively by means of the following equations:

$$R_0 = \left(\frac{L_{R'}}{L_{Rmax}}\right)^{\frac{1}{\gamma}} \times 255;$$

$$G_0 = \left(\frac{L_{G'}}{L_{Gmax}}\right)^{\frac{1}{\gamma}} \times 255;$$

$$B_0 = \left(\frac{L_{B'}}{L_{Bmax}}\right)^{\frac{1}{\gamma}} \times 255;$$

$$W_0 = \left(\frac{L_{W'}}{L_{Wmax}}\right)^{\frac{1}{\gamma}} \times 255;$$

wherein, $L_{R'}$ represents the luminance output value of the red in the RGBW luminance output values, $L_{G'}$ represents the luminance output value of the green in the RGBW luminance output values, $L_{B'}$ represents the luminance output value of the blue in the RGBW luminance output values, and $L_{W'}$ represents the luminance output value of the white in the RGBW luminance output values; $R_o$ represents the output signal value of the red in the RGBW signals, $G_o$ represents the output signal value of the green in the RGBW signals, $B_o$ represents the output signal value of the blue in the RGBW signals, and $W_o$ represents the output signal value of the white in the RGBW signals; $L_{Rmax}$ represents a maximum luminance value of the red, $L_{Gmax}$ represents a maximum luminance value of a green, $L_{Bmax}$ represents a maximum luminance value of the blue, and $L_{Wmax}$ represents a maximum luminance value of the white; $\gamma$ represents a gamma conversion factor.

* * * * *